Sept. 20, 1971  D. L. WENHAM  3,605,496
FLOW RATE GAUGES
Filed Nov. 10, 1969  2 Sheets-Sheet 1
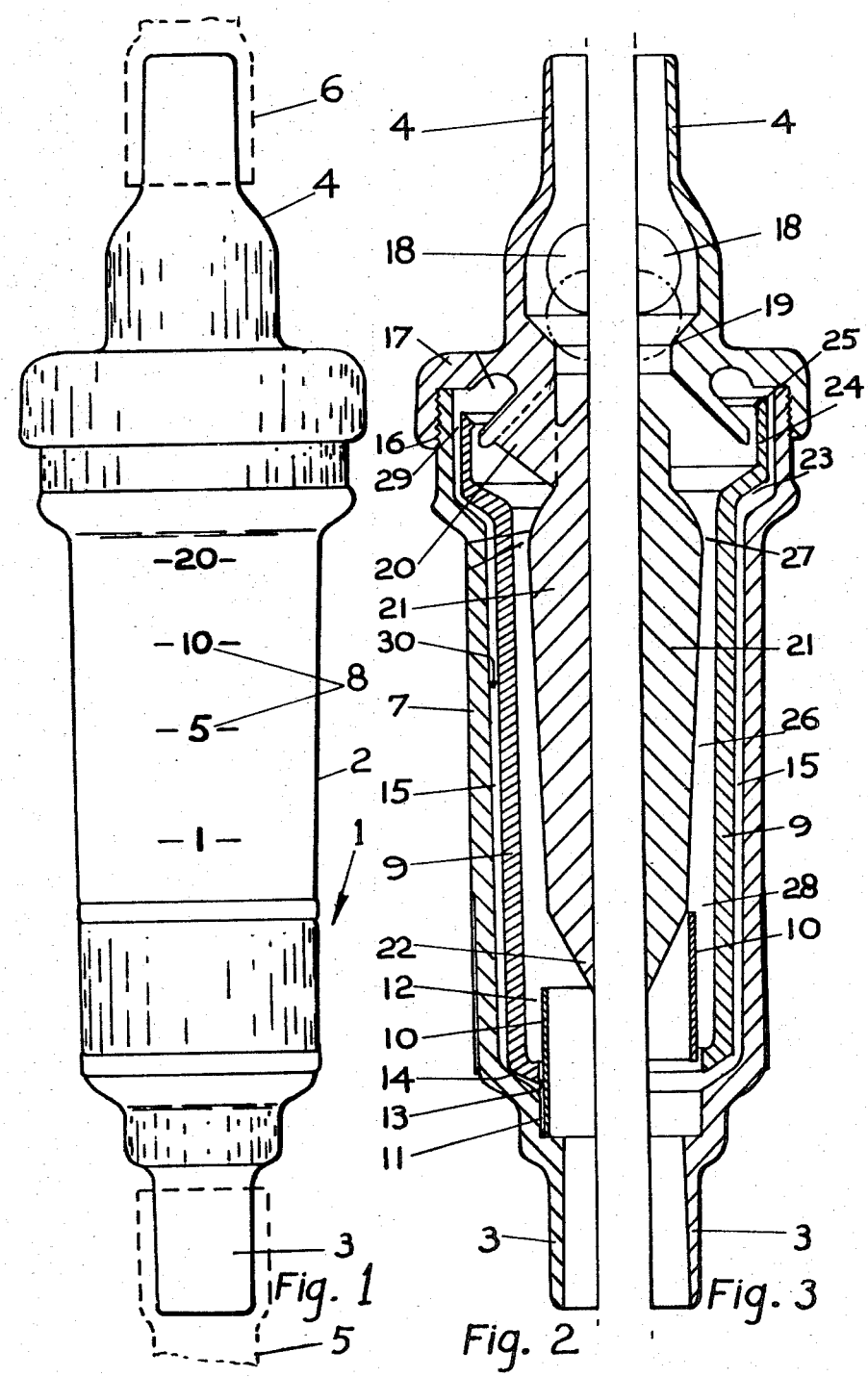
INVENTOR
DOUGLAS LEE WENHAM
By Holman, Glascock, Downing
& Seebold
ATTORNEYS Sept. 20, 1971          D. L. WENHAM          3,605,496
                        FLOW RATE GAUGES Filed Nov. 10, 1969                        2 Sheets-Sheet 2

INVENTOR
DOUGLAS LEE WENHAM
By Holman, Glascock, Downing
& Seebold
                ATTORNEYS

United States Patent Office 3,605,496
Patented Sept. 20, 1971

3,605,496
FLOW RATE GAUGES
Douglas L. Wenham, Hamilton, New Zealand, assignor to Plastic Products Limited, Hamilton, New Zealand
Filed Nov. 10, 1969, Ser. No. 875,385
Int. Cl. G01f 5/00
U.S. Cl. 73—202   5 Claims

ABSTRACT OF THE DISCLOSURE

A flow rate gauge has a cylindrical body used vertically with a lower inlet and an upper outlet, a restriction to flow in the body and a liquid bypass bypassing the flow restricting means and including a sight glass, the level of liquid rising in the bypass indicating the rate of flow of liquid through the gauge. A non-return valve is provided to prevent the return flow of liquid and movable tubes within the body move when the gauge is laid on its side to permit cleaning liquid to pass through the bypass.

---

Figure 4:
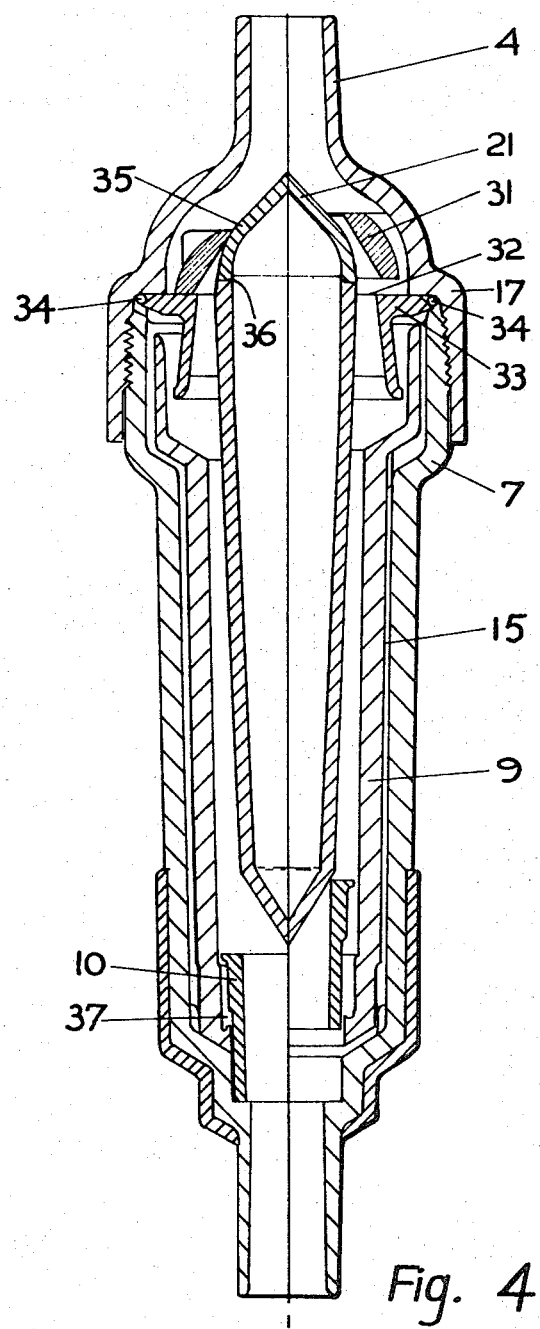

This invention relates to rate of flow gauges, and has been devised particularly though not solely for use in milking machines.

It is desirable that a rate of flow gauge, for use with for example, a milking machine, should cause little drop in pressure, should be readily read, easily cleaned, and should should be capable of being readily mounted in position.

It is therefore, an object of the present invention to provide a rate of flow gauge which will go at least some distance towards fulfilling the foregoing requirements, or which will at least provide the public with a useful choice.

Accordingly, the invention consists in a rate of flow gauge, comprising a hollow body, having an inlet in the lower part thereof, and an outlet in an upper part thereof, a passageway between said inlet and said outlet, an upper part of said passageway being of smaller cross sectional area than a lower part, a chamber above said upper part of said passageway being enlarged so that in use, liquid in said chamber is at a lower pressure than liquid in said lower part of said passageway, and restricted liquid bypass means including a sight gauge connecting said lower part of said passageway to said chamber, the construction and arrangement being such that in use on liquid passing through the gauge, the difference in pressure between said lower part and said chamber, causes liquid to rise in said bypass means, the level to which it rises being a measure of the rate at which liquid is flowing through the gauge.

One preferred form of the invention will now be described with reference to the accompanying drawings, in which, FIG. 1 is a side elevation of a rate of flow gauge, according to the invention, FIG. 2 is a half sectional elevation of the rate of flow gauge shown in FIG. 1, with the parts thereof in the operational position, FIG. 3 is as FIG. 2, but of the other half taken in the same plane as FIG. 2, but with the parts thereof in a position suitable for washing the device, and FIG. 4 is a cross section of an alternative construction, with moveable parts shown in the operating position on the left hand side and in the cleaning position on the right hand side.

Referring to the drawings, a rate of flow gauge 1 has a body 2 having an inlet 3 at a lower end thereof, and an outlet 4 at an upper end thereof, the inlet 3 and outlet 4 being adapted to be connected in a pipe or tube through which liquid flows, for example, resilient tubes 5 and 6 may be connected as shown by the pecked lines in FIG. 1. The tubes 5 and 6 are in the preferred form, the normal rubber tubes in a milking plant, and thus the milk flowing up the normal rubber tube 5 has an almost unchanged, i.e., substantially continuous, direction of flow upwardly through the gauge 1 when the gauge is in position. Normal sight glasses cause one or more changes in direction, with a consequent turbulence and pressure loss.

Referring now to FIG. 2, the gauge is formed from plastic material with a casing 7 forming part of the body 2, and at least part of this casing 7 is transparent to form a sight glass as will be referred to further later. The transparent portion of the casing 7 may include numerals to give a reading which is an indication of the rate of flow through the gauge. Two movable parts are provided in the casing 7, one of these comprising a slidable baffle 9 which comprises a shaped tubular member and which is preferably made of a plastic material and, for example, for milk, a black plastic material is desirable, with a good colour contrast, so that the gauge may be easily read. The second movable part comprises a sleeve 10. This sleeve is simply a short cylinder of, for example, metal tubing, and fits in a guiding socket 11 in the bottom of the casing 7 adjacent the inlet 3. The sleeve 10 tends to cause a pool of liquid to be maintained in the annular space 12 between the sleeve and the baffle 9 and leading from the pool of liquid is a restricted passageway 13 and 14 leading to an annular space 15 between the cylindrical wall of the baffle 9 and the inner surface of the casing 7. Thus, the passageways 13 and 14 provide a restriction leading to a liquid by pass provided by the space 15.

The casing 7 has a male upper thread which engages a correspondin gthread 16 of a cap 17 which completes the body 2, the cap 17 having associated with it the outlet 4 of the gauge.

Mounted in the outlet 4, is a ball 18 of a non-return valve of which the seat is provide by the shoulders 19, this non-return valve preventing the return of milk, which would upset the accuracy of the gauge.

Associated with the cap 17, and connected thereto by six ribs 20 spaced at 60° is a torpedo or restricting means 21 arranged as a concentric tapered rod having a pointed end 22 at the lower or inlet end. Within the upper part of the casing 7 is an enlarged chamber 23 and the upper end 24 of the baffle 9 has a lip 25 mounted with clearance in the enlarged chamber 23. Between the torpedo 21 and the inner wall of the baffle 9 there is a passageway 26 and an upper part 27 of this passageway has a smaller cross sectional area than a lower part 28 thereof. The change in cross sectional area between the spaces 27 and 28 is not abrupt, but is changed smoothly to assist in obtaining streamline flow of liquid in the passageway 26. The effect of the restriction 27 is to cause a slight pressure differential between space 12 and the chamber 23, the latter being at a lower pressure than the former, and since the bypass 15 leads via space 29 into the chamber 23, this pressure differential will operate over the bypass 15.

The baffle 9 and the sleeve 10 are preferably constructed of materials having a sufficient density and hence weight such that these members will be retained in their lowermost positions, shown in FIG. 2, against the upward flow of fluid when the meter is in its normal, substantially vertical operative position. When the meter is inclined towards a generally horizontal position, however, the flow of fluid may then readily displace the baffle 9 and sleeve 10 away from such positions towards the outlet 4, permitting self-cleaning of the meter in a manner to be described more fully hereunder.

The operation of the construction is as follows. Referring to FIG. 2, the inlet 3 and outlet 4 are connected in a line through which liquid is flowing upwardly in accordance with the diagram. Thus, in the preferred form, milk will flow into the bottom of the gauge, and because of the restriction 27, there will be a tendency for the lower part of the gauge to fill with milk, the particular result of which is that a pool of milk will be formed in the space 12 itself. Also, because of the restriction 27, there will be a pressure differential between the lower end or spaces 13 and 14 and the upper end or space 29 of the bypass 15 and, as a result of this pressure differential, the degree of which is dependent on the rate of flow, milk will be drawn from the pool in the space 12, part way up the bypass 15, but the pressure differential is arranged so that it is insufficient to draw milk completely up this space under normal working conditions. Accordingly, the level of milk in the bypass 15 is an indication of the rate of flow of milk through the gauge, and the level may be seen through the transparent part of the casing 7, the level say 30, may be read off against the numerals 8 so that there is an indication of the level in the tube and hence of the rate of flow.

For washing purposes, the inlet 3 is lifted and maintained for example by hooking it up so that the gauge is effectively rotated to about 90°, thus lying on its side as compared with the position shown in the drawings. This allows a rush of cleaning fluid to push the baffle 9 and the tube 10 towards the outlet 4 as shown in FIG. 3, the tube 10 contacting the coned end of the torpedo 21, and the baffle 9 pressing upwardly towards the cap 17 but held a short distance away by ribs (not shown) to allow cleaning fluid to pass to the outlet 4. With these movable members in this position, the flow through the passageway 26 is restricted, thus diverting cleaning fluid through the bypass passageway 15, causing a thorough washing of all parts of the interior. This obviates the necessity of breaking down the gauge for cleaning every time milking takes place.

When the gauge is moved back to its normal vertical disposition, any remaining washing fluid in the gauge drains slowly away between the sleeve 10 and the casing 7, and passes downwardly to the inlet 3. Referring to FIG. 4, a ring type non-return valve 31 is shown, this valve sitting against the surface 32 of a skirted insert 33, which in turn seals against the casing 7 and the cap 17 by an O ring 34. The ring 31 also seals against the surface 35 of the torpedo 21. In this construction, the torpedo is shown as being hollow, there being a joint 36. In this construction also, a tube 10 is shaped as shown so that the passageway 37 is restricted in a desirable manner.

The advantages, compared with the usual sight glass, which splashes milk and froths against the window, are:

(1) There is 360° visibility, (from any high or low position) of the level of liquid, for example, milk, in the space 15.
(2) The gauge may be mounted directly in a milking machine dropper, and this mounting is simple and, therefore, easy to effect.
(3) The gauge provides a substantially straight through run for the milk, causing only a slight increase in resistance to flow as compared with a straight line of tubing. The ribs 20 are, of course, kept to a minimum cross sectional area to limit their resistance to flow.
(4) The construction gives positive washing in a very simple yet effective manner.
(5) Because of the provision of a pool in the space 12, there is little surging resulting from changes in the flow rate, and the effect of frothing on reading the meter is reduced or obviated.
(6) The non return valve isolates the teat cups from any sudden changes of vacuum occurring in the rest of the milking machine.
(7) The non return valve also prevents cross infection due to milk falling from the milk line due to a sudden increase in pressure in the milk line.

What I claim is:

1. A rate of flow gauge in a fluid flow system, comprising a hollow body having an inlet to a lower part thereof, an outlet in an upper part thereof, and a through-flow passage between said inlet and outlet; a sight glass communicating at one end thereof with said through-flow passage adjacent to said inlet and at the other end thereof to said outlet; pool-forming means disposed in said through-flow passage and adapted to form a pool of fluid in said passage above said inlet and said one end of said sight tube; and flow-restricting means disposed in said passage above said pool-forming means and adapted to create a pressure differential between said inlet and said outlet, whereby a portion of the fluid flow will be drawn into said sight tube to a height corresponding to the degree of pressure differential created by said flow-restricting means, to thereby provide a visual indication of the rate of fluid flow.

2. A rate of flow gauge as defined in claim 1, wherein said flow-restricting means comprises an elongated member extending longitudinally through said through-flow passage generally centrally thereof and spaced from the walls thereof to define an annular passageway between said member and said walls, said elongated member having an enlarged-diameter portion defining a portion of said annular passageway with a restricted cross-section.

3. A rate of flow gauge as defined in claim 2, wherein said pool-forming means comprises a short cylindrical member within said through-flow passage adjacent said inlet and normally disposed in a first position restricting fluid flow from said inlet to said sight tube while permitting unrestricted fluid flow from said inlet to said through-flow passage, and said cylindrical member being movable to a second position wherein it restricts fluid flow to said through-flow passage while permitting substantially unrestricted flow to said sight tube, whereby said sight tube may be self-cleaned by the fluid flow.

4. A rate of flow gauge as defined in claim 3, further comprising an elongated hollow baffle disposed within said body, and spaced from the walls thereof to define an annular passageway therebetween, said annular passageway comprising said sight tube; the interior of said baffle member comprising said through-flow passageway; and at least a portion of said body being transparent.

5. A rate of flow gauge as claimed in claim 1, further comprising a one-way valve disposed in said outlet to prevent return fluid flow from said outlet into the gauge.

References Cited

UNITED STATES PATENTS

| 1,126,275 | 1/1915 | Rice | 73—213 |
| 1,159,817 | 11/1915 | Wilkinson | 73—205 |
| 1,639,342 | 8/1927 | Hanson | 73—211 |
| 2,197,214 | 4/1940 | Hollander | 73—213 |
| 2,043,636 | 6/1936 | Thompson | 73—202 |
| 3,481,197 | 12/1969 | Wenham | 73—202 |
| 3,538,768 | 11/1970 | Duncan | 73—202 |

RICHARD C. QUEISSER, Primary Examiner

C. E. SNEE III, Assistant Examiner

U.S. Cl. X.R.

73—205